United States Patent
Tanaka et al.

(10) Patent No.: US 12,494,859 B2
(45) Date of Patent: Dec. 9, 2025

(54) OPTICAL PATH DESIGN APPARATUS, OPTICAL PATH DESIGN METHOD AND PROGRAM

(71) Applicant: NTT, Inc., Tokyo (JP)

(72) Inventors: Takafumi Tanaka, Musashino (JP); Takuya Ohara, Musashino (JP); Fumikazu Inuzuka, Musashino (JP); Takuya Oda, Musashino (JP); Masayuki Shimoda, Musashino (JP)

(73) Assignee: NTT, Inc., Tokyo (JP)

( * ) Notice: Subject to any disclaimer, the term of this patent is extended or adjusted under 35 U.S.C. 154(b) by 193 days.

(21) Appl. No.: 18/029,726

(22) PCT Filed: Oct. 22, 2020

(86) PCT No.: PCT/JP2020/039655
§ 371 (c)(1),
(2) Date: Mar. 31, 2023

(87) PCT Pub. No.: WO2022/085141
PCT Pub. Date: Apr. 28, 2022

(65) Prior Publication Data
US 2023/0412299 A1 Dec. 21, 2023

(51) Int. Cl.
*H04J 14/02* (2006.01)
*H04B 10/27* (2013.01)

(52) U.S. Cl.
CPC .......... *H04J 14/0267* (2013.01); *H04B 10/27* (2013.01)

(58) Field of Classification Search
CPC ............................ H04J 14/0267; H04B 10/02
See application file for complete search history.

(56) References Cited

U.S. PATENT DOCUMENTS

| 6,678,524 B1 | 1/2004 | Hansson et al. |
| 6,914,972 B1 | 7/2005 | Baumeister et al. |

(Continued)

FOREIGN PATENT DOCUMENTS

| EP | 3041311 | 7/2016 |
| JP | A-10-117215 | 5/1998 |

(Continued)

OTHER PUBLICATIONS

Wei Lu, "Dynamic Service Provisioning of Advance Reservation Requests in Elastic Optical Networks", Nov. 16, 2015, 2015 International Conference on Photonics in Switching (PS) (Year: 2015).*

(Continued)

*Primary Examiner* — Pranesh K Barua
(74) *Attorney, Agent, or Firm* — Fish & Richardson P.C.

(57) ABSTRACT

An optical path design device includes a scheduling unit configured to generate, according to demand information, including information on a frequency bandwidth required for communication between a first node device at a start point of an optical path and a second node device at an end point of an optical path, and including information on a future time zone in which the communication will be executed, allocation content including information on a route connecting the first node device and the second node device and information on a center frequency of the frequency allocated to the communication corresponding to the demand information and determine the start time and the end time of the allocation of the allocation content, and a queue for adjusting a timing of allocation of the allocation content in the future time zone based on the start time and the end time of the allocation in a case where the allocation content cannot be allocated to the communication corresponding to the demand information with the current time as the start time of the allocation.

6 Claims, 15 Drawing Sheets

(56) References Cited

U.S. PATENT DOCUMENTS

| | | | |
|---|---|---|---|
| 7,519,049 B2 | 4/2009 | Masuda | |
| 7,822,065 B2 | 10/2010 | Lu | |
| 8,719,534 B1 | 5/2014 | Ray, III et al. | |
| 9,141,420 B2 | 9/2015 | Chang et al. | |
| 9,146,769 B1 | 9/2015 | Shankar et al. | |
| 9,785,478 B1 | 10/2017 | Babu B R et al. | |
| 11,089,105 B1 | 8/2021 | Karumbunathan et al. | |
| 11,301,407 B2 | 4/2022 | Sen et al. | |
| 2003/0184651 A1 | 10/2003 | Ohsawa et al. | |
| 2006/0171713 A1* | 8/2006 | Feng | H04J 14/025 370/468 |
| 2007/0079307 A1 | 4/2007 | Dhawan et al. | |
| 2008/0235361 A1 | 9/2008 | Crosbie et al. | |
| 2009/0240790 A1 | 9/2009 | Utsunomiya et al. | |
| 2010/0042636 A1 | 2/2010 | Lu | |
| 2011/0126047 A1 | 5/2011 | Anderson et al. | |
| 2012/0117563 A1 | 5/2012 | Chang et al. | |
| 2012/0327953 A1* | 12/2012 | Vokkarane | H04J 14/0257 370/442 |
| 2013/0262390 A1 | 10/2013 | Kumarasamy et al. | |
| 2014/0019621 A1 | 1/2014 | Khan et al. | |
| 2014/0181984 A1 | 6/2014 | Kundu et al. | |
| 2014/0258533 A1 | 9/2014 | Antony | |
| 2015/0363219 A1 | 12/2015 | Katsuri et al. | |
| 2017/0235817 A1 | 8/2017 | Deodhar et al. | |
| 2017/0324472 A1* | 11/2017 | Kitamura | H04L 27/2601 |
| 2018/0191601 A1 | 7/2018 | Micallef | |
| 2019/0042325 A1 | 2/2019 | Nair | |
| 2019/0327144 A1 | 10/2019 | Tembey et al. | |
| 2019/0339320 A1 | 11/2019 | Dzafic | |
| 2020/0218684 A1 | 7/2020 | Sen et al. | |
| 2020/0412657 A1 | 12/2020 | Jang et al. | |
| 2022/0158756 A1 | 5/2022 | Wang et al. | |

FOREIGN PATENT DOCUMENTS

| | | |
|---|---|---|
| JP | A-2003-535526 | 11/2003 |
| JP | A-2005-064970 | 3/2005 |
| JP | A-2006-527541 | 11/2006 |
| JP | A-2010-521761 | 6/2010 |
| JP | A-2012-505561 | 3/2012 |
| JP | A-2015-065527 | 4/2015 |
| JP | A-2015-527649 | 9/2015 |
| KR | 10-2014-0003200 A | 1/2014 |
| WO | WO 01/93607 A1 | 12/2001 |
| WO | WO 2004/111775 A2 | 12/2004 |
| WO | WO 2010/041582 A1 | 4/2010 |
| WO | WO 2015/029416 | 3/2015 |
| WO | WO 2020/143380 | 7/2020 |

OTHER PUBLICATIONS

Masahiko Jinno, "Virtualization in Optical Networks from Network Level to Hardware Level [Invited]", Oct. 2013, Optical Society of America (Year: 2013).*

ATEN International Co., Ltd., "KE6920 datasheet," ver. 01, Jun. 17, 2020, retrieved from URL <https://assets.aten.com/product/spec_sheet/JP/ke6920-6922_ver01j.pdf>, ATEN Product Information KE6920, pp. 1-5 (No Translation).

Bijoy Chand Chatterjee et al., "Routing and Wavelength Assignment for WDM-based Optical Networks," Springer, pp. 35-43, vol. 410, 2017.

International Search Report in International Appln. No. PCT/JP2020/036303, dated Feb. 2, 2021, 6 pages (with English Translation).

International Search Report in International Appln. No. PCT/JP2020/039655, dated Feb. 16, 2021, 6 pages (with English Translation).

K. Yamaguchi et al., "M×N Wavelength Selective Switches Using Beam Splitting By Space Light Modulators," IEEE Photonics Journal, vol. 8, No. 1, Feb. 2016.

M. Jinno et al., "An Overview of Elastic Optical Networks," Proceedings of the 2013 IEICE Communications Society Conference, 2013, p. SS-98-SS-99 (No Translation).

Pegah Afsharlar et al., "Routing and Spectrum Assignment with Delayed Allocation in Elastic Optical Networks," Journal of Optical Communications and Networking, 2017, pp. 1-10.

R. A. Wagner and S. E. Dreyfus, "The Steiner Problem in Graphs," Networks 1, Dreyfus and Wagner, pp. 195-207, 1972.

Ramesh Govindan et al., "An Architecture for Stable, Analyzable Internet Routing," IEEE Network, vol. 13, issue 1, pp. 29-35, 1999.

Ryan Shea and Jiangchuan Liu, "Cloud Gaming: Architecture and Performance," IEEE Network, Jul./Aug. 2013, IEEE 2013, pp. 16-21.

Takamichi Nishijima et al., "On the Impact of Network Environment on Remote Desktop Protocols," IEICE Technical Report CQ2012-21 (Jul. 2012), 2012, pp. 23-28 (English Abstract).

Wei Lu et al., "Dynamic Service Provisioning of Advance Reservation Requests in Elastic Optical Networks," Journal of Lightwave Technology, vol. 31, Issue. 10, 2013, pp. 1621-1627.

Y. Liu et al., "The Degree-Constrained Multicasting Algorithm Using Ant Algorithm," Proceedings of the 10th International Conference on Telecommunications, 2003, pp. 370-374.

Yang Chen et al., "Optical Burst Switching: A New Area in Optical Networking Research," IEEE Network, vol. 18, issue 3, pp. 16-23, 2004.

* cited by examiner

| ALLOCATION REQUEST IDENTIFICATION INFORMATION | STARTING POINT | END POINT | NUMBER OF FREQUENCY SLOTS (MINIMUM VALUE: 1, MAXIMUM VALUE: 3) | COMMUNICATION START TIME | COMMUNICATION END TIME | COMMUNICATION DURATION |
| --- | --- | --- | --- | --- | --- | --- |
| ... | ... | ... | ... | ... | ... | ... |
| R4 | A | C | 3 | — | — | T1 |
| R5 | A | C | 2 | t4 | t4 | T1 |

Fig. 3

| OPTICAL PATH IDENTIFICATION INFORMATION | ALLOCATION REQUEST IDENTIFICATION INFORMATION | ROUTE | NUMBER OF FREQUENCY SLOTS (MINIMUM VALUE: 0, MAXIMUM VALUE: 2) | COMMUNICATION START TIME | COMMUNICATION END TIME |
|---|---|---|---|---|---|
| P1 | R1 | A-B-C | SL0 | t1 | t2 |
| P2 | R2 | A-B-C | SL1, SL2 | t1 | t3 |
| P3 | R3 | A-D-C | SL0, SL1 | t1 | t1 |

Fig. 4

| OPTICAL PATH IDENTIFICATION INFORMATION | ALLOCATION REQUEST IDENTIFICATION INFORMATION | ROUTE | NUMBER OF FREQUENCY SLOTS (MINIMUM VALUE: 0, MAXIMUM VALUE: 2) | COMMUNICATION START TIME | COMMUNICATION END TIME |
|---|---|---|---|---|---|
| P4 | R4 | A-D-C | SL0, SL1, SL2 | t2 | t2 |
| P5 | R5 | A-D-C | SL0, SL1 | t4 | t4 |

Fig. 5

| ALLOCATION REQUEST IDENTIFICATION INFORMATION | STARTING POINT | END POINT | NUMBER OF FREQUENCY SLOTS (MINIMUM VALUE: 1, MAXIMUM VALUE: 3) | COMMUNICATION START TIME | COMMUNICATION END TIME | COMMUNICATION DURATION |
|---|---|---|---|---|---|---|
| ... | ... | ... | ... | ... | ... | ... |
| R4 | A | C | 3 | - | - | T1 |
| R5 | A | C | 2 | t4 | t4 | T1 |
| R6 | A | C | 1 | - | - | T1 |
| R7 | A | C | 2 | - | t4 | T1 |
| R8 | A | C | 2 | t3 | t4 | T2 |

Fig. 6

| ROUTE | FREQUENCY SLOT NUMBER | COMMUNICATION TIME ZONE | | | |
|---|---|---|---|---|---|
| | | t1 | t2 | t3 | t4 |
| A-B-C | SL0 | R1 | R1 | (R6) | - |
| | SL1 | R2 | R2 | R2 | - |
| | SL2 | R2 | R2 | R2 | - |
| A-D-C | SL0 | R3 | R4 | (R7) | R5 |
| | SL1 | R3 | R4 | - | R5 |
| | SL2 | - | R4 | - | - |

Fig. 7

| ROUTE | FREQUENCY SLOT NUMBER | COMMUNICATION TIME ZONE | | | |
|---|---|---|---|---|---|
| | | t1 | t2 | t3 | t4 |
| A-B-C | SL0 | R1 | R1 | (R6) | (R7) |
| | SL1 | R2 | R2 | R2 | R5 |
| | SL2 | R2 | R2 | R2 | R5 |
| A-D-C | SL0 | R3 | R4 | (R8) | (R8) |
| | SL1 | R3 | R4 | (R8) | (R8) |
| | SL2 | – | R4 | – | – |

Fig. 12

OPTICAL PATH DESIGN APPARATUS, OPTICAL PATH DESIGN METHOD AND PROGRAM

CROSS-REFERENCE TO RELATED APPLICATIONS

This application is a National Stage application under 35 U.S.C. § 371 of International Application No. PCT/JP2020/039655, having an International Filing Date of Oct. 22, 2020.

The disclosure of the prior application is considered part of the disclosure of this application, and is incorporated by reference in its entirety into this application.

TECHNICAL FIELD

The present invention relates to an optical path design apparatus, optical path design method and program.

BACKGROUND ART

In a conventional optical network, in a case where a demand for an optical path (path and frequency of an optical signal) increases with an increase in traffic volume, a control device allocates a new optical path in response to the increased demand. The optical path thus allocated is not released in principle. For example, in a case where the traffic volume increases in the optical network, the already allocated optical path is maintained without being released, and a new optical path is allocated in response to the increased traffic amount.

On the other hand, there is an optical network design technique for dynamically allocating an optical path in response to a changing demand (refer to NPL 1). In such an optical network, the control device releases the allocation of the optical path with the end of communication.

FIG. 15 is a diagram illustrating a conventional configuration example of a control device 100. The control device includes a generation unit 101, a storage unit 102, an allocation unit 103, and a control unit 104.

The generation unit 101 generates a signal requesting the allocation of the optical path (hereinafter referred to as "allocation request signal") according to the demand information (information on a client device of a transmission source, a device of a client device of a reception source, and information on the volume of communication traffic). The storage unit 102 stores information on an existing optical path in an optical network. The allocation unit 103 generates allocation content of the optical path according to the allocation request signal. The control unit 104 outputs a control signal for setting a parameter of the allocation content to a node device of an optical network.

CITATION LIST

Non Patent Literature

[NPL 1] Bijoy Chand Chatterjee, et al., "Routing and Wavelength Assignment for WDM-based Optical Networks," Springer, pp. 35-43.

SUMMARY OF INVENTION

Technical Problem

FIG. 16 is a flow chart illustrating an example of the operation of the conventional control device 100. An allocation unit 103 searches one or more routes from a start point to an end point in an optical network (step S1). An allocation unit 103 detects the current state of frequency allocation for each searched route (step S2). An allocation unit 103 determines whether there is a route to which a frequency can be allocated at the present time (the time when the allocation request signal is received) (step S3). In a case where it is determined that there is a route to which the frequency can be allocated at the present time point (step S3, YES), the allocation unit 103 allocates the route to which the frequency can be allocated at the present time point and the frequency to the demand (step S4). In a case where it is determined that there is no route to which the frequency can be allocated at the present time (step S3: NO), the allocation unit 103 rejects the allocation request (step S5).

In this way, in a case where there is no optical path (route and frequency) that can be allocated when the control device receives the demand information, the optical path is allocated to the communication corresponding to the received demand information. However, there is a problem that the allocation request is rejected.

In view of the above circumstances, an object of the present invention is to provide an optical path design device, an optical path designing method, and a program for suppressing the rejection of a communication optical path allocation request.

Solution to Problem

An aspect of the present invention is an optical path design device including a scheduling unit configured to generate, according to demand information, including information on a frequency bandwidth required for communication between a first node device at a start point of an optical path and a second node device at an end point of an optical path, and including information on a future time zone in which the communication will be executed, allocation content including information on a route connecting the first node device and the second node device and information on a center frequency of the frequency allocated to the communication corresponding to the demand information and determine the start time and the end time of the allocation of the allocation content, and a queue for adjusting a timing of allocation of the allocation content in the future time zone based on the start time and the end time of the allocation in a case where the allocation content cannot be allocated to the communication corresponding to the demand information with the current time as the start time of the allocation.

An aspect of the present invention is an optical path designing method executed by an optical path design device, the method including a scheduling step of generating, according to demand information, including information on a frequency bandwidth required for communication between a first node device at a start point of an optical path and a second node device at an end point of an optical path, and including information on a future time zone in which the communication will be executed, allocation content including information on a route connecting the first node device and the second node device and information on a center frequency of the frequency allocated to the communication corresponding to the demand information and determining the start time and the end time of the allocation of the allocation content, and a queue step of adjusting a timing of allocation of the allocation content in the future time zone based on the start time and the end time of the allocation in a case where the allocation content cannot be allocated to the communication corresponding to the demand information with the current time as the start time of the allocation.

An aspect of the present invention is a program for causing a computer to function as an optical path design device.

Advantageous Effects of Invention

According to the present invention, it is possible to suppress rejection of a communication optical path allocation request.

BRIEF DESCRIPTION OF DRAWINGS

FIG. 3 is a diagram illustrating an example of allocation request information in the first embodiment.

FIG. 4 is a diagram illustrating an example of allocation current information in the first embodiment.

FIG. 5 a diagram illustrating an example of allocation reservation information in the first embodiment.

FIG. 6 is a diagram illustrating an example of the allocation request information to which an allocation request signal is added in the first embodiment.

FIG. 7 is a diagram illustrating an example of a requested communication time zone in the first embodiment.

FIG. 12 is a diagram illustrating an example of a requested communication time zone in a third embodiment.

FIG. 5 is a diagram illustrating a conventional configuration example of a control device.

DESCRIPTION OF EMBODIMENTS

Embodiments of the present invention will be described in detail with reference to the drawings.

First Embodiment

Figure 1:
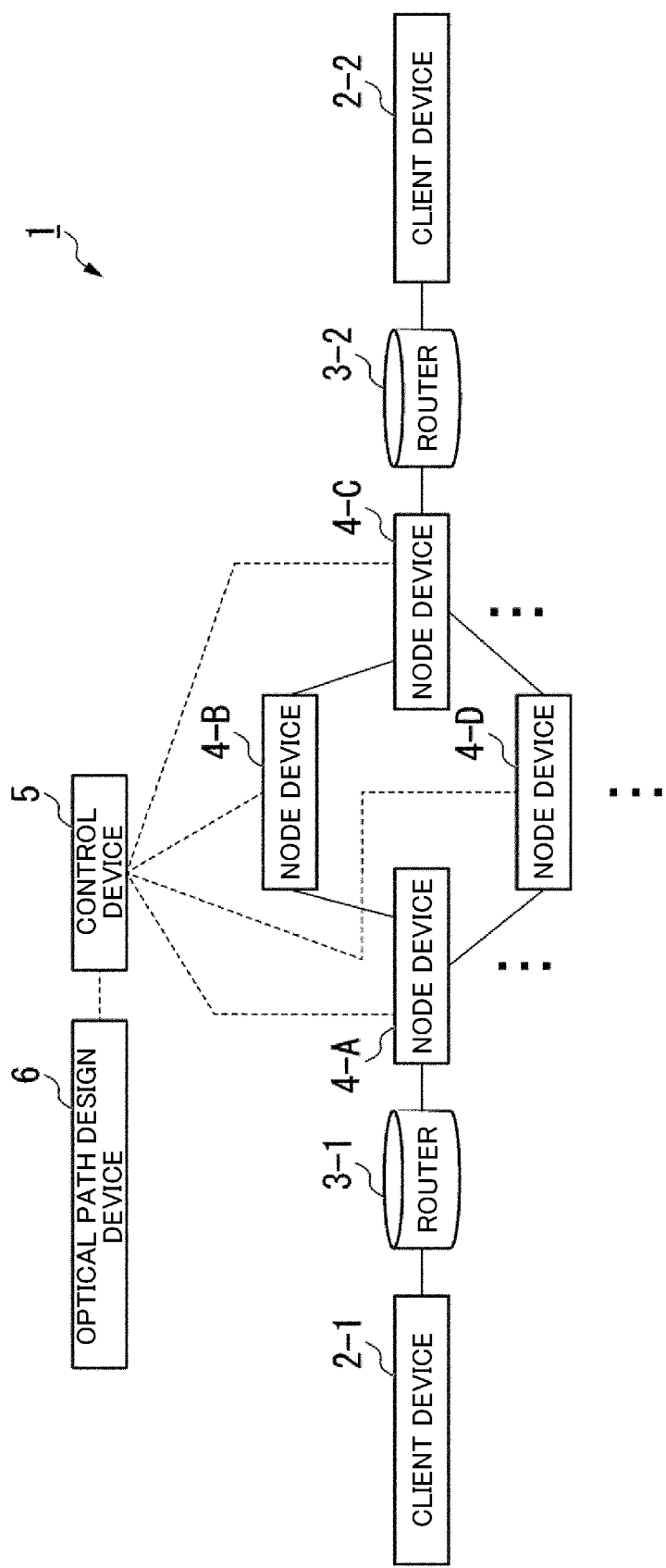
FIG. 1 is a diagram illustrating a configuration example of a communication system according to a first embodiment.

FIG. 1 is a diagram illustrating a configuration example of a communication system 1. The communication system 1 includes a plurality of client devices 2, a plurality of routers 3, a plurality of node devices 4, a control device 5, and an optical path design device 6 (optical path design apparatus).

The number of each of the client devices 2, the routers 3, the node devices 4, the control device 5, and the optical path design device 6 illustrated in FIG. 1 is an example.

The routers 3 may be switches. The plurality of node devices 4 configure an optical network. In FIG. 1, the communication system 1 includes, as an example, a node device 4-A, a node device 4-B, a node device 4-C, and a node device 4-D.

A client device 2-1 is a communication device of a transmission source of a main signal (data). The client device 2-1 transmits the main signal to the router 3-1. The router 3 is an apparatus for aggregating traffic of the client device 2 (end user). That is, the router 3-1 transmits the optical signal transmitted from the client device 2-1 to the optical network.

In the optical network, each node device 4 relays an optical signal. In FIG. 1, a start point of the route of the main signal node (optical signal) in the optical network is a node device 4-A as an example. An end point of the route of the main signal in the optical network is, for example, the node device 4-C. The node device 4-C outputs the main signal to the router 3-2. The router 3-2 transmits the optical signal to the client device 2-2. The client device 2-2 is a communication device of a reception destination of the main signal.

The control device 5 is a management device of an optical network. That is, the control device 5 is a device configured to control (manage) communication processing of the plurality of node devices 4. The control device 5 generates an allocation request signal according to demand information of an optical path (route and frequency) in the optical network. The control device 5 outputs the allocation request signal to the optical path design device 6.

The demand information includes information on a start point of an optical network connected to a client device of a transmission source, information on an end point of an optical network connected to a client device of a reception source, information on a bandwidth (traffic volume) of a frequency required for communication, information on communication start time, and information on the communication end time.

The allocation request signal is a signal for requesting the allocation of the optical path at the present time (current time) or in the future in response to the demand of the optical path at the present time or in the future. The allocation request signal includes information on a start point and an end point of the optical network, information on a bandwidth (traffic volume) of a frequency of the main signal, information on a communication start time, and information on a communication end time.

The control device 5 acquires the allocation content at the present time from the optical path design device 6 as a response to the allocation request signal. The control device 5 generates parameters (for example, information on a main signal route, information on a center frequency, information on a communication start time, and information on a communication end time) based on the allocation content at the present time. The control device 5 sets a parameter for each node device 4 of the route of the main signal by using a control signal for setting the parameter. In a case where the allocation of the optical path is canceled, the control device 5 may set the parameters for each node device 4 of the route of the main signal by using a control signal similar to the control signal used when the allocation of the optical path is set.

A control protocol is defined by each vendor as a unique specification, for example. The control protocol may be NETCONF (RFC6241)/RESTCONF (RFC8040) based on the data model defined by YANG (IETF RFC7950).

The optical path design device 6 is a device that schedules (determines and manages) the allocation of optical paths (route, frequency, communication start time, and communication end time). The optical path design device 6 communicates with the control device 5, for example, when information exchange related to the design of the optical path is required. The optical path design device 6 acquires the allocation request signal from the control device 5. The optical path design device 6 generates the allocation content at the present time based on the allocation request signal. The optical path design device 6 outputs the allocation content at the present time to the control device 5 without a waiting time.

In a case where the optical path cannot be allocated at the present time (in a case where the current time is set as the start time of allocation and the allocation content cannot be allocated to the communication corresponding to the demand information), the optical path design device 6 may generate future allocation content based on the allocation request signal so that the optical path can be allocated in the future communication time zone. The optical path design device 6 adjusts the timing of allocation of route and frequency allocation content in a future time zone. That is, the optical path design device 6 adjusts the timing (output timing) of the allocation of the future allocation content until the future allocation content can be allocated at the present time. In a case where the waiting time has passed since the future allocation content was generated, and the future allocation content is available for allocation at the present time, the optical path design device 6 outputs the generated future allocation content to the control device 5 as the allocation content at the present time (the time when the waiting time has elapsed).

Figure 2:
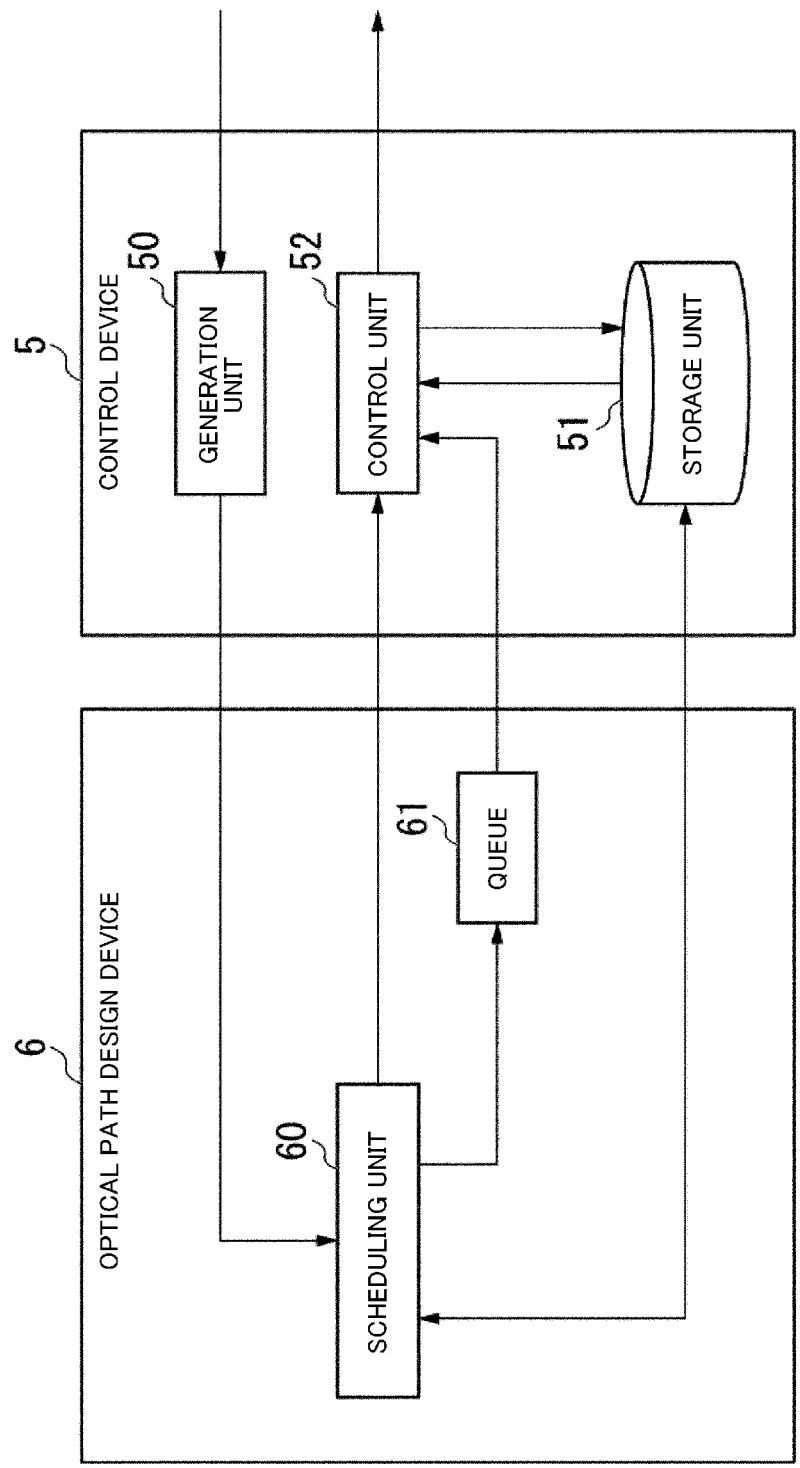
FIG. 2 is a diagram illustrating a configuration example of each of a control device and an optical path design device in the first embodiment.

FIG. 2 is a diagram illustrating an configuration example of each of the control device 5 and the optical path design device 6. The control device 5 includes a generation unit 50, a storage unit 51, and a control unit 52. The optical path design device 6 includes a scheduling unit 60 and a queue 61. The optical path design device 6 may include at least one of the generation unit 50, the storage unit 51, and the control unit 52.

The generation unit 50 acquires or generates demand information. The generation unit 50 generates an allocation request signal based on the demand information. The generation unit 50 outputs the generated allocation request signal to the scheduling unit 60.

The transmission source of the demand information is determined according to the operation form of the optical network. For example, the network operator manually inputs demand information to the generation unit 50. That is, the generation unit 50 acquires the demand information from the network operator.

For example, in a case where the frequency band is temporarily changed according to a result of monitoring the state of the traffic volume by the generation unit 50, the generation unit 50 may generate the demand information in accordance with the state of the traffic volume in the optical network.

For example, the generation unit 50 may acquire demand information from each node device 4 of the optical network. The generation unit 50 acquires demand information from each node device 4 by using, for example, a route (communication line) different from the route of the main signal. The path different from the path of the main signal is, for example, a data communication network (DCN).

For example, the generation unit 50 may acquire the demand information from a device other than the optical network. For example, in a case where a service that an end user can temporarily occupy a large-capacity optical path is provided to the end user by using an optical network, the generation unit 50, for example, uses a route different from a route of the main signal to acquire demand information from the client device 2.

For example, in a case where the frequency band is temporarily changed in accordance with a result of monitoring the state of the traffic volume by the router 3, the router 3 may generate the demand information in accordance with the state of the traffic volume in the optical network. The generation unit 50 acquires demand information from each router 3 by using, for example, a route (communication line) different from the route of the main signal.

The storage unit 51 stores topology information of the optical network, the allocation request information, the allocation status information, the allocation reservation status, and the information of the node device 4 (for example, address information). The allocation reservation information may be stored in the queue 61. The allocation request information includes each allocation request signal generated according to each demand information of the optical path. The allocation present state information is information on an existing optical path. That is, the allocation current information is the allocation information actually allocated at the present time. The allocation reservation state is information on an optical path whose allocation is reserved. That is, the allocation reservation information is allocation information which is not actually allocated at the present time.

FIG. 3 is a diagram illustrating an example of the allocation request information. The allocation request signal is registered in the allocation request information in the order of acquisition by the scheduling unit 60. In the allocation request information, allocation request identification information, a start point, an end point, the number of frequency slots, the communication start time, the communication end time, and the communication duration are associated with each other.

The start point is a start point of the route in the optical network, which is the node device 4-A in FIG. 1. The end point is the end point of the route in the optical network, which is node device 4-C in FIG. 1. The number of frequency slots is determined according to the frequency bandwidth (traffic volume) required for communication. The communication duration is the time length of the communication time zone (the time zone from the start time to the end time of the allocation of the optical path).

FIG. 4 is a diagram illustrating the allocation current information. In the allocation current information, optical path identification information, allocation request identification information, a route, a frequency slot number, the communication start time, and the communication end time are associated with each other.

The optical path identification information is identification information of an optical path in an optical network. The allocation request identification information is identification information on an allocation request signal generated according to the demand information. The route represents a route connecting the node devices 4 for relaying the main signal. For example, the route "A-B-C" represents a route connecting the node device 4-A, the node device 4-B, and the node device 4-C in the optical network. The frequency slot number is a slot number in the frequency band. The communication start time is the start time of the communication time zone (the time zone from the start time to the end time of the allocation of the optical path). The communication end time is the end time of the communication time zone.

FIG. 5 is a view illustrating an example of the allocation reservation information. In the allocation reservation information, the optical path identification information, the allocation request identification information, the route, the frequency slot number, the communication start time, and the communication end time are associated with each other. In this way, items of the allocation current information and items of the allocation reservation information are common to each other.

Referring to FIG. 2 again, a description of a configuration of each example of the control device 5 and the optical path design device 6 will be continued. The scheduling unit 60 acquires the topology information of the optical network from the storage unit 51. The scheduling unit 60 may acquire the allocation current information and the allocation reservation information from the storage unit 51. The scheduling unit 60 (scheduler) acquires the allocation request signal from the generation unit 50.

The scheduling unit 60 executes accommodation design of communication. That is, the scheduling unit 60 schedules the allocation of the allocation content of the main signal route, the frequency band of the main signal, and the communication time zone (allocation time zone) according to the allocation request signal. The scheduling unit 60 allocates the optical path identification information to the demand information corresponding to the allocation request signal acquired from the generation unit 50.

In a case where the allocation is possible at the present time, the scheduling unit 60 outputs the allocation content at the present time determined by the scheduling to the control device 5 without a waiting time. Thus, the allocation content at the present time are set in the node device 4 by the control device 5 without a waiting time. The scheduling unit 60 registers the allocation request signal in the allocation current information stored in the storage unit 51.

The scheduling unit 60 adds the future allocation content determined by scheduling to the queue 61 in a case where allocation is possible at a future time point in a range satisfying the demand request. The parameter of the allocation content added to the queue 61 is set in the node device 4 by the control device 5 after the lapse of the waiting time. The scheduling unit 60 registers the allocation request signal in the allocation reservation information stored in the storage unit 51 or the queue 61.

For example, the allocation information (route, frequency slot number, communication start time, and communication end time) associated with the allocation request identification information "R4" of the optical path identification information "P4" illustrated in FIG. 5 is output from the queue 61 to the control device 5 at a time "t2" after the lapse of the waiting time, and is set in the node device 4 by the control device 5. In addition, the scheduling unit 60 or the control unit 52 deletes the allocation information associated with the allocation request identification information "R4" of the optical path identification information "P4" from the allocation reservation information and registers the information in the allocation current information.

In a case where the scheduling unit 60 further acquires the allocation request signal from the generation unit 50, the scheduling unit 60 adds the allocation request signal to the allocation request information.

FIG. 6 is a diagram illustrating an example of allocation request information to which an allocation request signal is added. In comparison with the allocation request information shown in FIG. 3, allocation request signals of allocation request identification information "R6," "R7," and "R8" are added in FIG. 6.

The scheduling unit 60 arranges the communication start time and the communication end time requested by using the allocation request signal in time series based on the allocation current information illustrated in FIG. 4 and the allocation reservation information illustrated in FIG. 5.

FIG. 7 is a diagram illustrating an example of a requested communication time zone (time from the communication start time to the communication end time). In FIG. 7, the requested communication time zone is shown in time series from a communication start time "t1" to a communication end time "t4". For example, an optical path of a route "A-B-C" and a frequency slot "SL0" is already allocated to demand information corresponding to an allocation request signal of allocation request identification information "R1" in a communication time zone from the communication start time "t1" to the communication end time "t2".

As illustrated in FIG. 6, the communication start time and the communication end time newly requested from the generation unit 50 by using the allocation request signal of the allocation request identification information "R6" are the time of an arbitrary "-" clock respectively. Further, the communication duration (the length of the communication time zone) newly requested from the generation unit 50 using the allocation request signal is "T1," and the number of frequency slots (frequency bandwidth) is "1".

On the other hand, as illustrated in FIG. 7, there is a vacancy (unallocated) satisfying the request in a time "t3" and the frequency slot "SL0" of the route "ABC". Therefore, the scheduling unit 60 allocates the optical paths of the route "A-B-C" and the frequency slot "SL0" to the demand of the optical paths using each node device 4 of the route "A-B-C" at the time "t3". The scheduling unit 60 or the control unit 52 registers the allocation request signal of the allocation request identification information "R6" in the allocation current information.

As illustrated in FIG. 6, the communication start time newly requested from the generation unit 50 using the allocation request signal of the allocation request identification information "R7" is an arbitrary "-" time. The requested communication end time is the time "t4". Further, the communication duration (the length of the communication time zone) newly requested from the generation unit 50 using the allocation request signal is "T1," and the number of frequency slots (frequency bandwidth) is "2".

On the other hand, as illustrated in FIG. 7, there is a vacancy in the time "t3" and the frequency slot "SL0" of the route "A-D-C" satisfying the requirements. Therefore, the scheduling unit 60 allocates the optical path of the route "A-D-C" and the frequency slot "SL0" to the demand for the optical path using each node device 4 of the route "ADC" at the time "t3" or the time "t4" without a waiting time. The scheduling unit 60 or the control unit 52 registers the allocation request signal of the allocation request identification information "R7" in the allocation current information.

As illustrated in FIG. 6, the communication start time newly requested from the generation unit 50 by using the allocation request signal of the allocation request identification information "R8" is time "t3". The requested communication end time is a time "t4". Further, the communication duration newly requested from the generation unit 50 by using the allocation request signal is "T2", and the number of frequency slots (frequency bandwidth) is "2".

On the other hand, as illustrated in FIG. 7, there is no vacancy satisfying the request in the time and frequency slot of any route. Therefore, the scheduling unit 60 rejects the allocation request signal of the allocation request identification information "R8".

The queue 61 temporarily holds future allocation content (allocation reservation information). The queue 61 outputs the held future allocation content to the control device 5 as the allocation content at the present time after the lapse of the waiting time. Thus, the future allocation content are set in the node device 4 by the control device 5 after the lapse of the waiting time.

The control unit 52 acquires the allocation content at the present time from the scheduling unit 60. The control unit 52 acquires information on the node device 4 from the storage unit 51. The allocation content at the present time acquired from the scheduling unit 60 is the allocation content at the present time transmitted from the scheduling unit 60 without a waiting time.

The control unit 52 acquires the future allocation content held in the queue 61 from the queue 61 as the allocation content at the present time when the communication start time reaches the current time. The allocation content at the present time acquired from the queue 61 is the future allocation content transmitted from the scheduling unit 60 after the lapse of a waiting time until the future time reaches the current time.

The control unit 52 generates a control signal for setting a parameter of the allocation content according to the allocation content at the present time. The control unit 52 outputs a control signal for setting allocation of an optical path to each node device 4 of the optical network in a case where a prescribed communication start time comes. The control unit 52 outputs a control signal for releasing the allocation of the optical path to each node device 4 of the optical network in a case where the prescribed communication end time comes. Thus, the parameters of the allocation content are set in each node device 4.

Since the waiting time becomes longer as the demand of the optical path increases, the control unit 52 may prioritize setting of the allocation content at the present time acquired from the queue 61 temporarily holding the future allocation content to the node device 4 rather than setting the allocation content at the present time acquired from the scheduling unit 60 to the node device 4. Accordingly, it is possible to reduce the waiting time.

Next, an operation example of the optical path design device 6 will be described.

Figure 8:
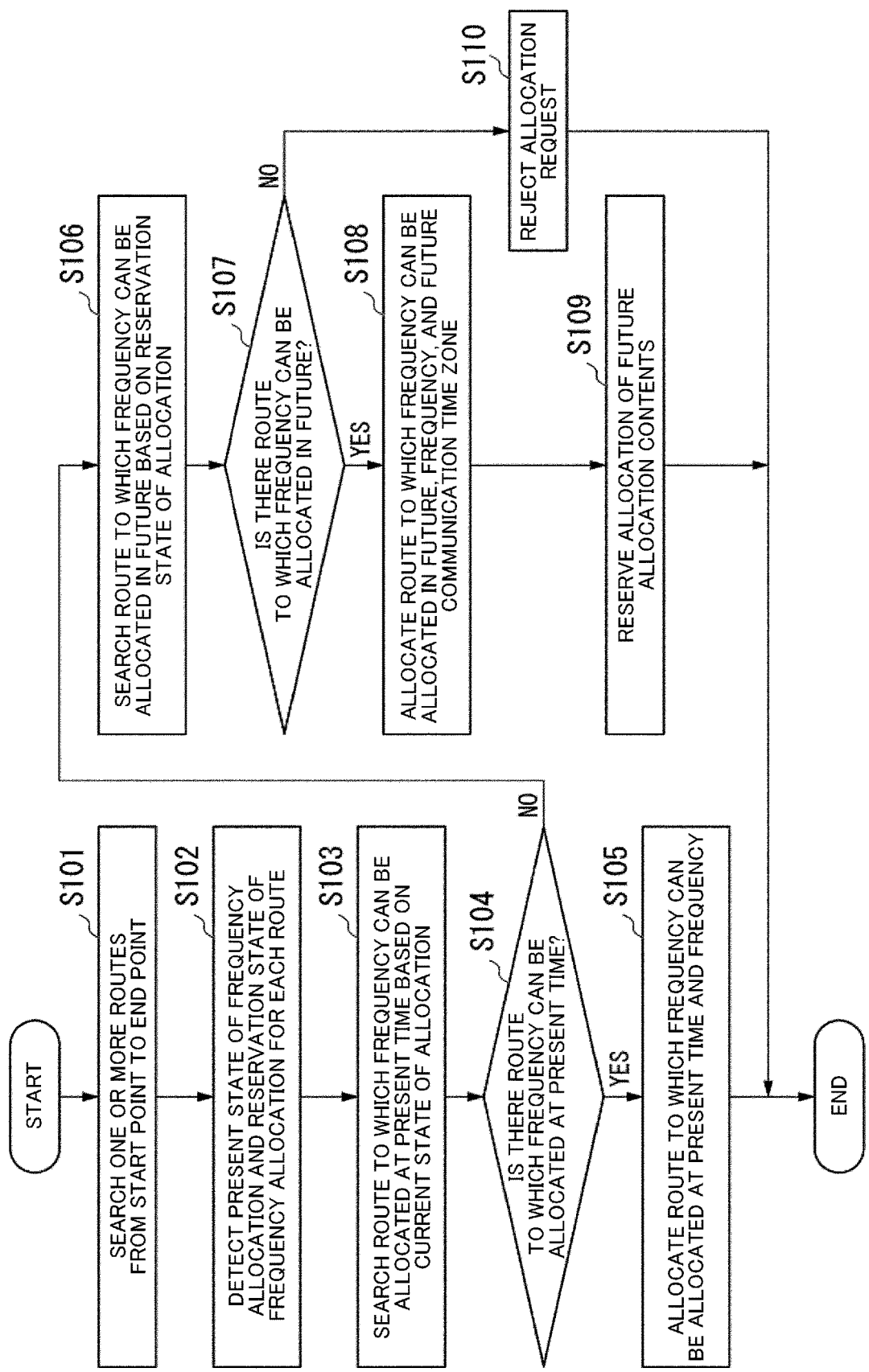
FIG. 8 is a flowchart illustrating an operation example of an optical path design device according to the first embodiment.

FIG. 8 is a flowchart illustrating an operation example (accommodation design algorithm) of the optical path design device 6. The scheduling unit 60 records the allocation request signal acquired from the generation unit 50 in the allocation request information stored in the storage unit 51. The scheduling unit 60 acquires allocation current information and allocation reservation information from the storage unit 51.

The scheduling unit 60 searches for one or more routes from a start point to an end point in the optical network (step S101). The scheduling unit 60 detects the current state of frequency allocation and the reservation state of frequency allocation for each searched route based on the allocation current information and the allocation reservation information (step S102).

The scheduling unit 60 searches for a route to which a frequency can be allocated at the present time (current time) based on the current state of allocation (step S103). The scheduling unit 60 determines whether there is a route to which a frequency can be allocated at the present time (step S104). In a case where it is determined that there is a route to which the frequency can be allocated at the present time (step S104: YES), the scheduling unit 60 allocates the route to which the frequency can be allocated at the present time and the frequency to the demand using the plurality of node devices 4 (step S105).

In a case where it is determined that there is no route to which the frequency can be allocated at the present time (step S104: NO), the scheduling unit 60 searches for a route to which a frequency can be allocated in the future based on the reservation status of allocation (step S106). The scheduling unit 60 determines whether there is a route to which a frequency can be allocated in the future (step S107). In a case where it is determined that there is a route to which the frequency can be allocated in the future (step S107: YES), the scheduling unit 60 allocates a route to which a frequency can be allocated in the future, a frequency, and a future communication time zone (reserved time) to the demand for using the plurality of node devices 4 (step S108). The scheduling unit 60 reserves the allocation of future allocation content by adding the future allocation content to the queue 61 (step S109). In a case where it is determined that there is no route to which the frequency can be allocated in the future (step S107: NO), the scheduling unit 60 rejects the allocation request (step S110).

As described above, the scheduling unit 60 generates allocation content including information on the route connecting the node device 4-A (first node device) and the node device 4-C (second node device) and information on the center frequency of the frequency allocated to the communication corresponding to the demand information, according to demand information. The demand information includes information on the frequency bandwidth required for communication between the node device 4-A at the start point of the optical path and the node device 4-C at the end point of the optical path, and information on the future time zone when communication will be executed. The scheduling unit 60 determines the start time and end time of the allocation of the allocation content. In a case where the current time is set as the start time of allocation and the allocation content cannot be allocated to the communication corresponding to the demand information, the queue 61 adjusts the timing of allocation of allocation content in a future time zone based on the start time and end time of allocation. Thus, in the accommodation design, not only the scheduling considering the allocation content at the present time (demand at the present time), but also the scheduling (allocation of route, frequency, communication start time, and communication end time) considering the allocation content (future demand) added to the queue 61 is executed.

Thus, it is possible to suppress the rejection of the communication optical path allocation request. Further, it is possible to satisfy the demand of the current optical path in a future time zone within a range satisfying the demand requirement.

Since the future allocation content includes not only the information of the route and frequency but also the information of the communication start time and the communication end time, even if there is no route and frequency which can be allocated when the scheduling unit 60 receives the demand information, it is possible to reserve setting of the parameter of the allocation content in the node device 4 in the future time zone.

In addition, the allocation content whose allocation is reserved is allocated to the demand of the optical path in preference to the allocation content at the present time. Thus, when the demand of the optical path is generated, the operation of the optical network satisfying the demand is possible.

Next, a modification example will be described.

Figure 9:
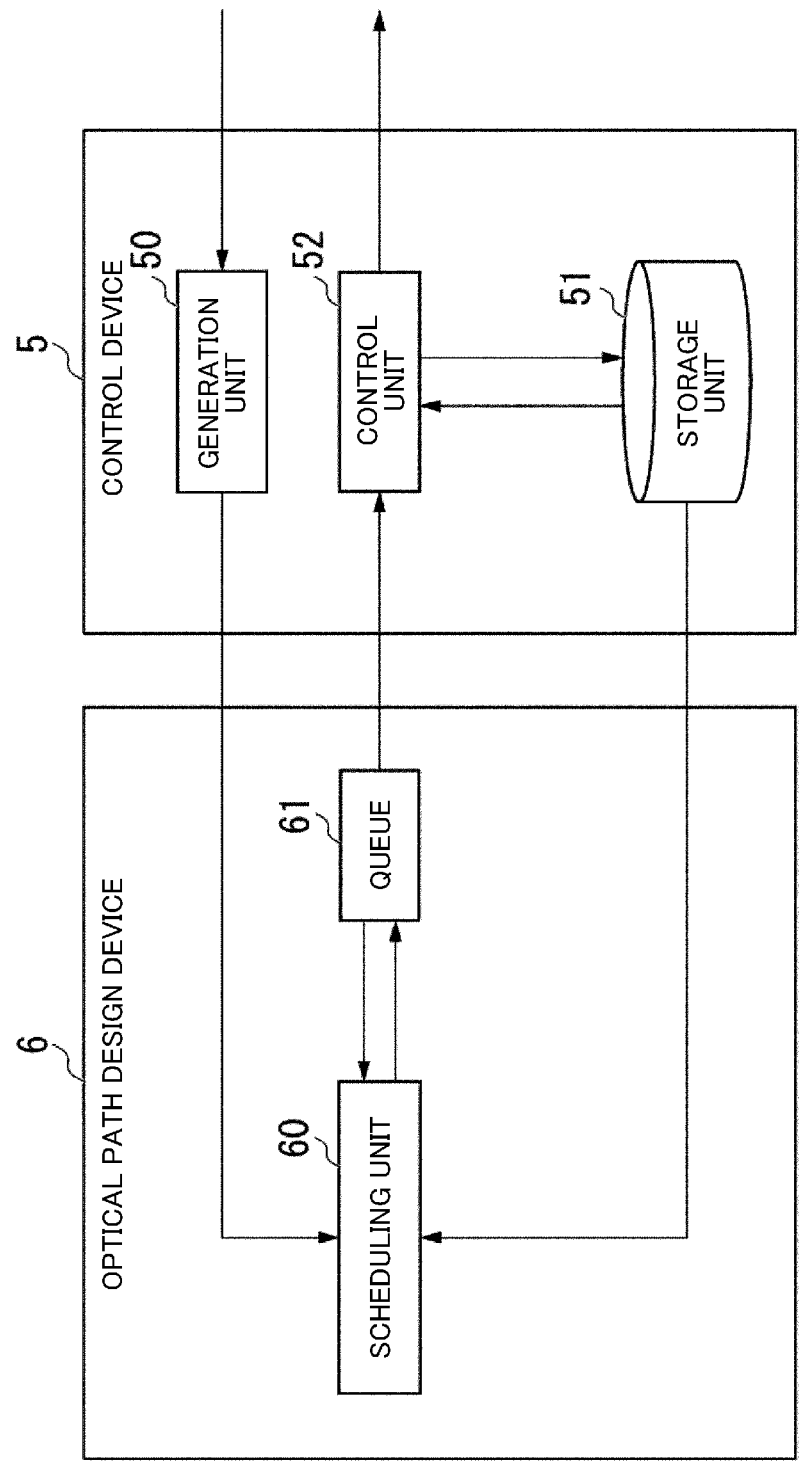
FIG. 9 is a diagram illustrating a first modification example of a configuration of each of the control device and the optical path design device in the first embodiment.

FIG. 9 is a diagram illustrating a first modification example of a configuration of each of the control device 5 and the optical path design device 6. In FIG. 9, even in a case where an optical path is allocated without a waiting time, the allocation content at the present time passes through the queue 61. That is, the scheduling unit 60 outputs the allocation content at the present time to the queue 61. The queue 61 outputs the allocation content at the present time to the control unit 52 without a waiting time.

Figure 10:
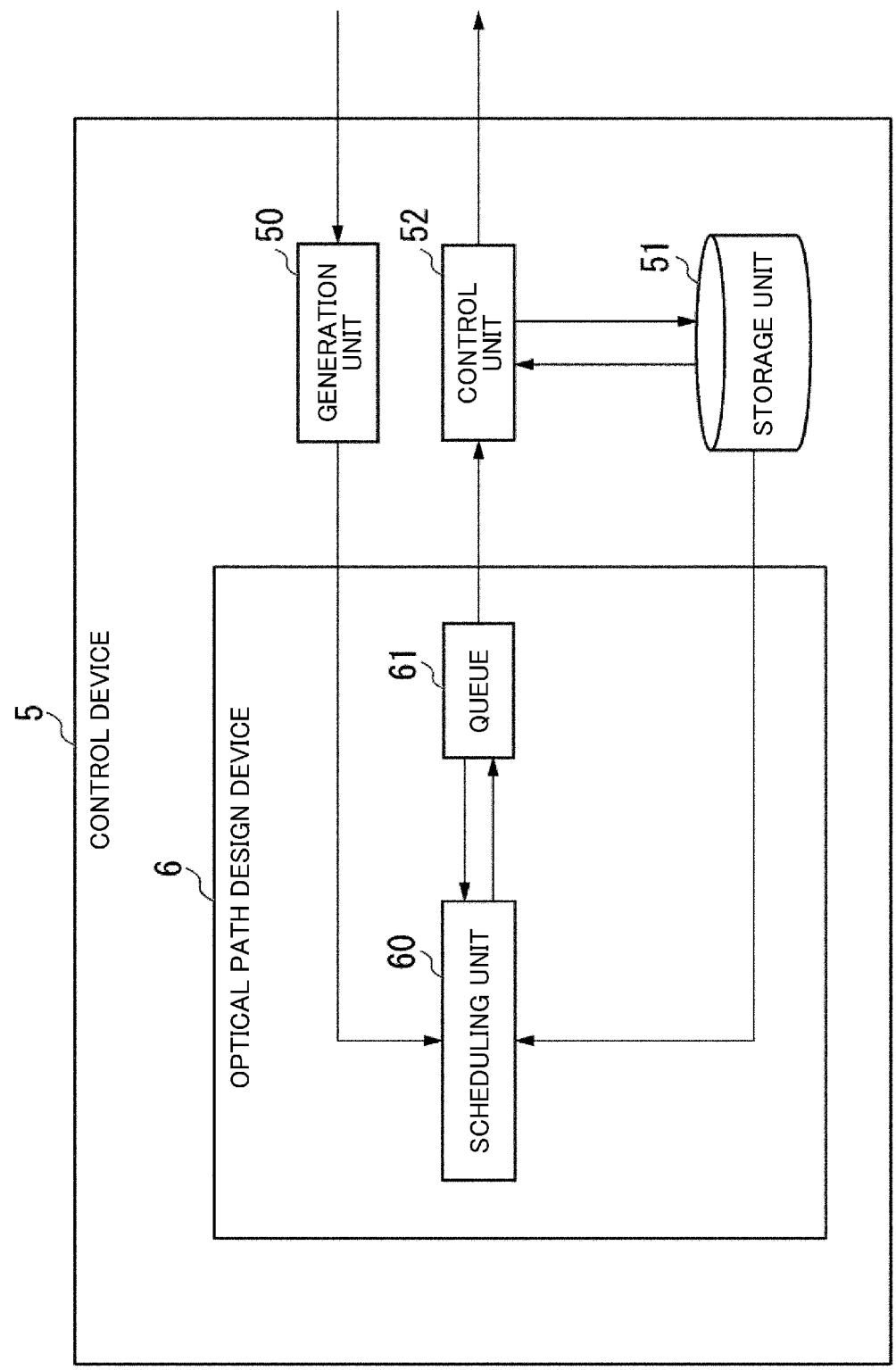
FIG. 10 is a view illustrating a second modification example of a configuration of each of the control device and the optical path design device in the first embodiment.

FIG. 10 is a diagram illustrating a second modification example of a configuration of each of the control device 5 and the optical path design device 6. In FIG. 2, the optical path design device 6 is independent of the control device 5 as a single device. On the other hand, in FIG. 10, the optical path design device 6 is provided in the control device 5 as one of the functional parts of the control device 5.

Second Embodiment

A second embodiment differs from the first embodiment in that it is determined whether there is a time in which a frequency can be allocated (whether there is a free time that meets the time requirement of demand), instead of determining whether or not a path and a frequency exist. In the second embodiment, differences from the first embodiment will be mainly described.

Figure 11:
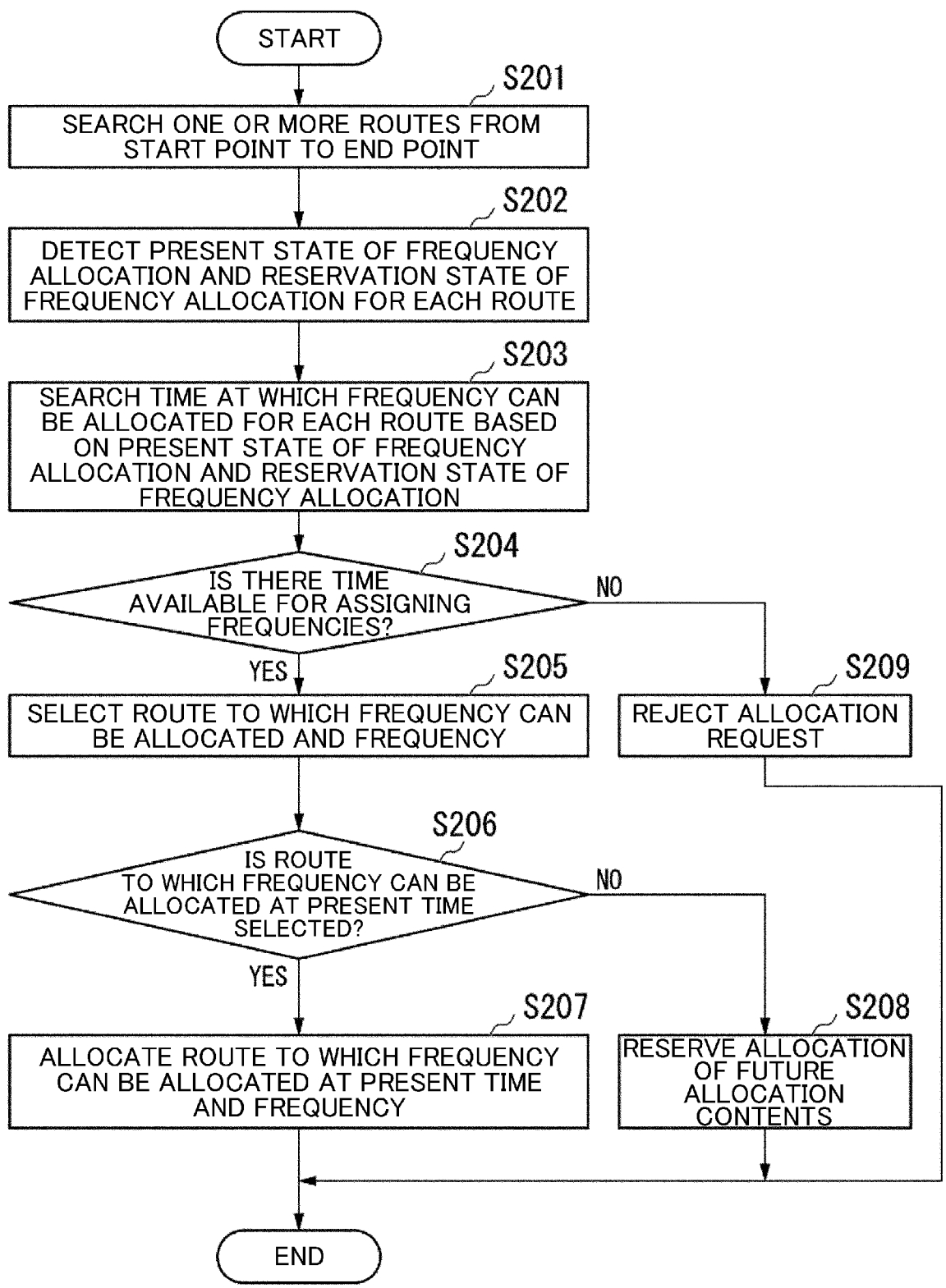
FIG. 11 is a flowchart illustrating an operation example of an optical path design device according to a second embodiment.

FIG. 11 is a flowchart illustrating an operation example of the optical path design device 6. The scheduling unit 60 searches for one or more routes from the start point to the end point in the optical network (step S201). The scheduling unit 60 detects the current status of frequency allocation and the reservation status of frequency allocation for each searched route based on the allocation current information and the allocation reservation information (step S202).

The scheduling unit 60 searches for the time at which the frequency can be allocated for each route based on the current status of frequency allocation and the reservation status of frequency allocation (step S203). The scheduling unit 60 determines whether there is a time in which the frequency can be allocated within the range that satisfies the allocation request (whether there is a free time that satisfies the time requirement of demand) (step S204). In a case where it is determined that there is a time in which the frequency can be allocated (step S204: YES), the scheduling unit 60 selects a route to which the frequency can be allocated and a frequency within a range satisfying the allocation request (step S205).

The scheduling unit 60 determines whether a route to which a frequency can be allocated is selected at the present time (step S206). In a case where it is determined that the route to which the frequency can be allocated at the present time is selected (step S206: YES), the scheduling unit 60 allocates the route to which the frequency can be allocated at the present time and the frequency to the demand using the plurality of node devices 4 (step S207). In a case where it is determined that the route to which the frequency can be allocated is not selected at the present time (step S206: NO), the scheduling unit 60 reserves the allocation of the future allocation content by adding the future allocation content to the queue 61 (step S208). In a case where it is determined that there is no time in which the frequency can be allocated (step S204: NO), the scheduling unit 60 rejects the allocation request (step S209).

As described above, the scheduling unit 60 determines whether there is a time in which the frequency can be allocated within a range satisfying the allocation request. In a case where it is determined that there is a time in which the frequency can be allocated, the scheduling unit 60 selects a route in which the frequency can be allocated and the frequency within a range satisfying the allocation request.

Thus, it is possible to suppress the rejection of a communication optical path allocation request.

Third Embodiment

A third embodiment differs from the first embodiment and the second embodiment in that the future allocation content added to the queue are reallocated to the new demand of the optical path. In the third embodiment, the differences between the first embodiment and the second embodiment will be mainly described.

FIG. 12 is a diagram showing an example of the requested communication time zone. In the first embodiment and the second embodiment, the allocation request signal of allocation request identification information "R8" following the allocation request identification information "R7" added to the queue 61 is rejected.

On the other hand, in the third embodiment, the scheduling unit 60 reallocates the allocation content added to the queue 61 to the demand for the optical path. For example, in a case where the allocation request signal of the allocation request identification information "R8" is rejected, the scheduling unit 60 reallocates the allocation content to the demand of the optical path for one or more pieces of allocation request identification information from the allocation request identification information "R4" to the allocation request identification information "R8".

In a case where there is time restriction in the demand of the optical path, the allocation request of the demand information having a margin with respect to the communication time zone is postponed, and the optical path is preferentially allocated to the demand information having no margin. That is, the scheduling unit preferentially allocates the allocation content to communication in which the start time of a future time zone included in the demand information is closer to the start time of allocation of the allocation content.

For example, in a case where the time "t3" and "t4" of the frequency slots "SL0" and "SL1" of the route "A-D-C" are allocated to the demand corresponding to the allocation request signal of the allocation request identification information "R8," the allocation request identification information items "R5" and "R7" whose allocation is already reserved are reallocated.

Here, it is possible to allocate the time "t4" of the frequency slots "SL1" and "SL2" of the route "A-B-C" to the demand corresponding to the allocation request signal of the allocation request identification information "R5". Further, the demand constraint (time requirement) corresponding to the allocation request signal of the allocation request identification information "R7" is also satisfied at the time "t4". Then, the scheduling unit 60 allocates a time "t4" which is a vacant time to a demand corresponding to an allocation request signal of allocation request identification information "R7".

Next, an operation example of the optical path design device 6 will be described.

Figure 13:
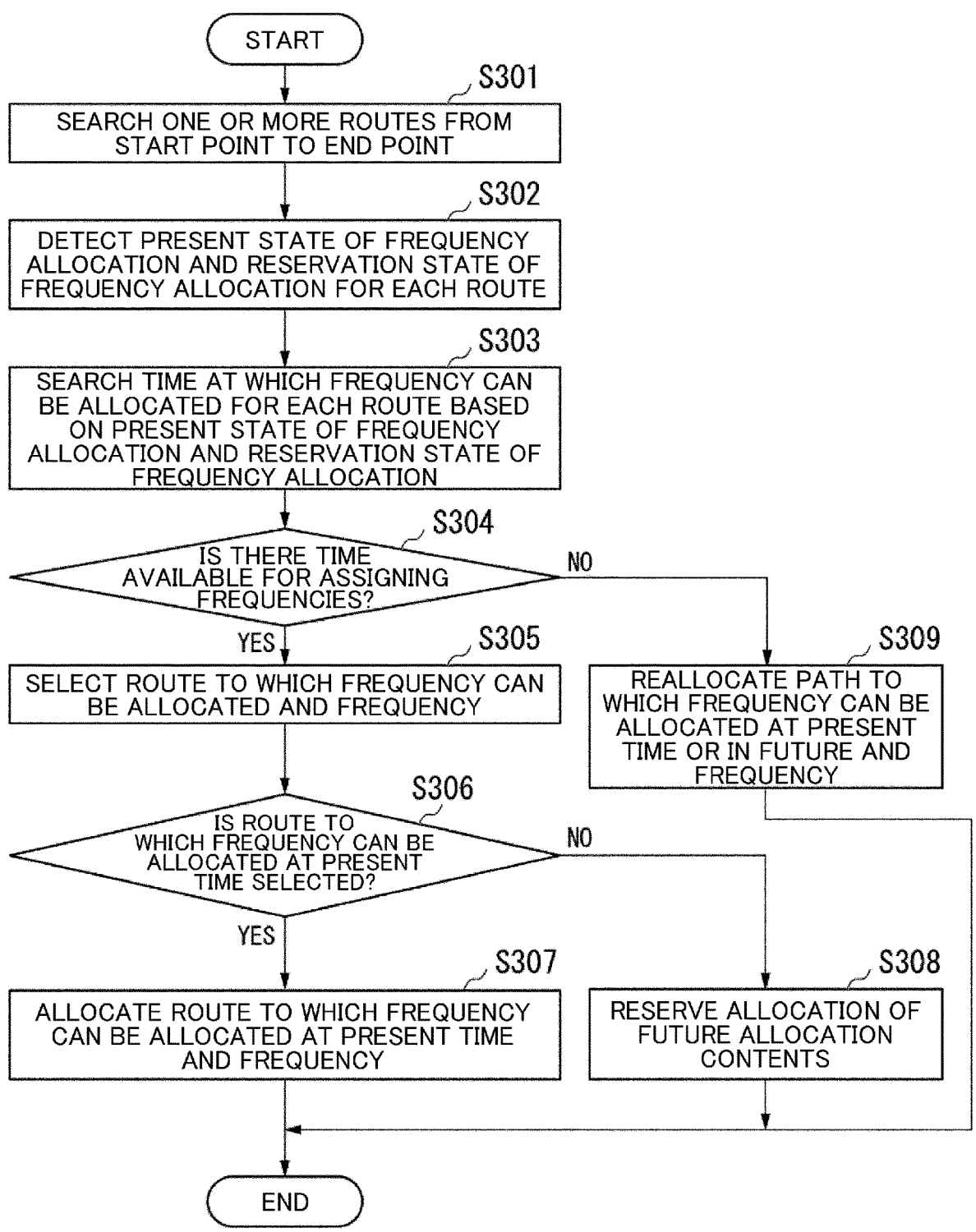
FIG. 13 is a flowchart illustrating an operation example of an optical path design device according to the third embodiment.

FIG. 13 is a flowchart illustrating an operation example of the optical path design device 6. Each operation from step S301 to step S308 is the same as each operation from step S201 to step S208 shown in FIG. 11. In a case where it is determined that there is no time to which the frequency can be allocated (step S304: NO), the scheduling unit 60 reallocates a route and a frequency to which a frequency can be allocated at the present time or in the future to a plurality of node devices 4 (step S309).

As described above, the scheduling unit 60 reallocates the route and the frequency to which the frequency can be allocated at the present time or in the future to the plurality of node devices 4. Thus, it is possible to further suppress the rejection of the communication optical path allocation request. Accordingly, the accommodation efficiency of communication can be improved. For example, it is possible to satisfy the demand corresponding to the allocation request signal of the subsequent allocation request identification information.

Figure 14:
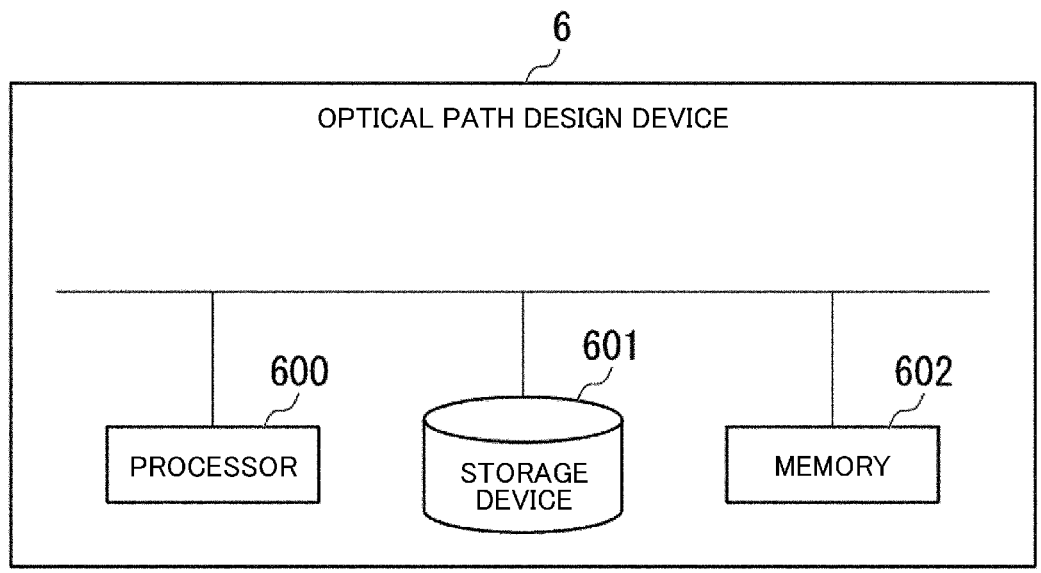
FIG. 14 is a diagram illustrating a hardware configuration example of an optical path design device in each embodiment.
Figure 15:
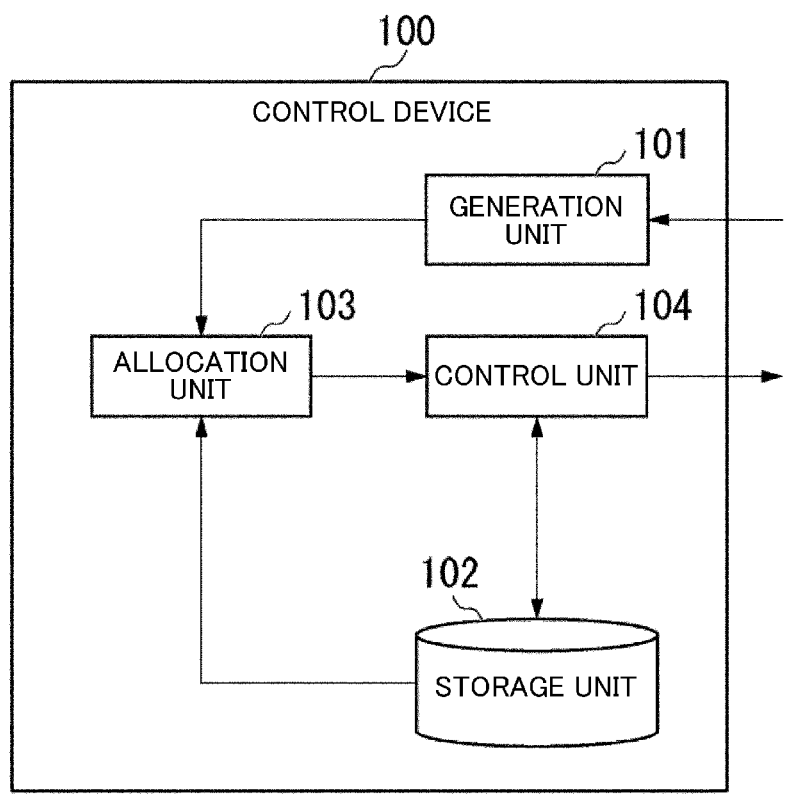
Figure 16:
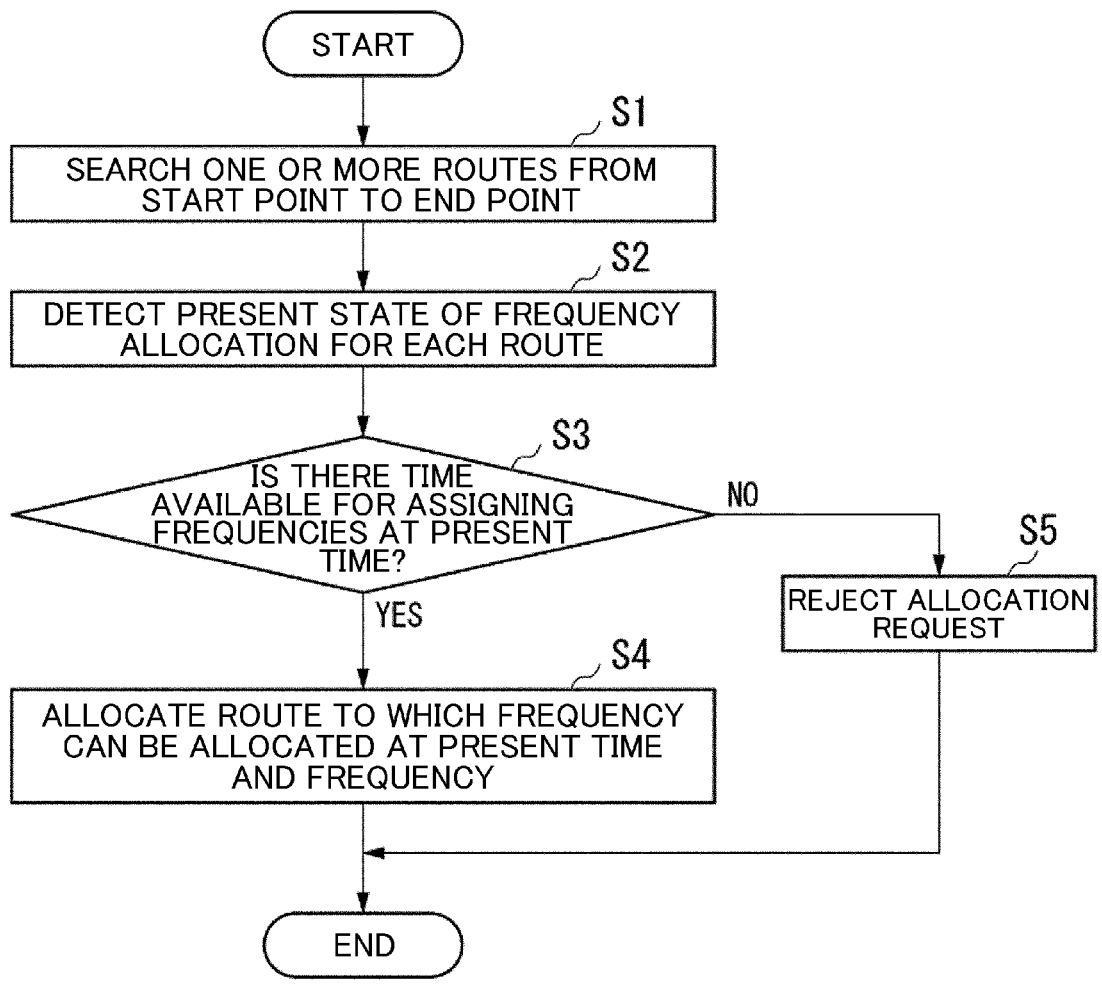
FIG. 16 is a flowchart illustrating a conventional operation example of a control device.

FIG. 14 is a diagram illustrating a hardware configuration example of the optical path design device 6 in each embodiment. A part or all of each functional unit of the optical path design device 6 is realized as software by a processor 600 such as a central processing unit (CPU) executing a program stored in a memory 602 having a non-volatile recording medium (non-temporary recording medium). The program may be recorded on a computer-readable recording medium. The computer-readable recording medium is, for example, a flexible disk, a magneto-optical disk, a portable medium such as a read only memory (ROM) or a compact disc read only memory (CD-ROM), or a non-temporary recording medium such as a storage device 601 such as a hard disk built in a computer system. A part or all of each functional part of the optical path design device 6 may be realized by using hardware including an electronic circuit or circuitry using, for example, a large scale integrated circuit (LSI), an application specific integrated circuit (ASIC), a programmable logic device (PLD), a field programmable gate array (FPGA), or the like.

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to an optical network communication system.

REFERENCE SIGNS LIST

1 Communication system
2 Client device
3 Router
4 Node device
5 Control device
6 Optical path design device
50 Generation unit
51 Storage unit
52 Control unit
60 Scheduling unit
61 Queue
600 Processor
601 Storage device
602 Memory

The invention claimed is:

1. An optical path design device comprising:
 a scheduler configured to generate, according to demand information, including information on a frequency bandwidth required for communication between a first node device at a start point of an optical path and a second node device at an end point of an optical path, and including information on a future time zone in which the communication will be executed, an allocation content including information on a route connecting the first node device and the second node device and information on a center frequency of a frequency band allocated to the communication corresponding to the demand information and determine a start time and an end time of an allocation of the allocation content; and
 a queue for adjusting a timing of allocation of the allocation content in the future time zone based on the start time and the end time of the allocation in a case where the allocation content cannot be allocated to the communication corresponding to the demand information with the current time as the start time of the allocation;
 wherein the scheduler is configured to reallocate the allocation content added to the queue to a demand for the optical path,
 wherein in a case where an allocation request for the optical path is rejected, the scheduler is configured to reallocate the allocation content added to the queue to the demand for the optical path.

2. The optical path design device according to claim 1, wherein the scheduler preferentially allocates the allocation content to the communication in which a start time of the future time zone as the information on the future time zone included in the demand information is closest to the start time of the allocation of the allocation content.

3. An optical path designing method executed by an optical path design device, the method comprising:
 generating, according to demand information, including information on a frequency bandwidth required for communication between a first node device at a start point of an optical path and a second node device at an end point of an optical path, and including information on a future time zone in which the communication will be executed, an allocation content including information on a route connecting the first node device and the second node device and information on a center frequency of a frequency band allocated to the communication corresponding to the demand information and determining a start time and an end time of an allocation of the allocation content; and
 adjusting a timing of allocation of the allocation content in the future time zone based on the start time and the end time of the allocation in a case where the allocation content cannot be allocated to the communication corresponding to the demand information with the current time as the start time of the allocation;
 wherein the allocation content added to the queue is reallocated to a demand for the optical path,
 wherein in a case where an allocation request for the optical path is rejected, the allocation content added to the queue is reallocated to the demand for the optical path.

4. The optical path designing method according to claim 3, wherein, the allocation content is preferentially allocated to the communication in which the start time of the future time zone included in the demand information is closer to the start time of the allocation of the allocation content.

5. A non-transitory computer readable medium storing a program for causing a computer to perform operations comprising:

generating, according to demand information, including information on a frequency bandwidth required for communication between a first node device at a start point of an optical path and a second node device at an end point of an optical path, and including information on a future time zone in which the communication will be executed, an allocation content including information on a route connecting the first node device and the second node device and information on a center frequency of a frequency band allocated to the communication corresponding to the demand information and determining a start time and an end time of an allocation of the allocation content; and adjusting a timing of allocation of the allocation content in the future time zone based on the start time and the end time of the allocation in a case where the allocation content cannot be allocated to the communication corresponding to the demand information with the current time as the start time of the allocation;

wherein the allocation content added to the queue is reallocated to a demand for the optical path, wherein in a case where an allocation request for the optical path is rejected, the allocation content added to the queue is reallocated to the demand for the optical path.

6. The non-transitory computer readable medium according to claim 5, wherein the allocation content is preferentially allocated to the communication in which a start time of the future time zone as the information on the future time zone included in the demand information is closest to the start time of the allocation of the allocation content.

* * * * *